United States Patent [19]

Takeda et al.

[11] Patent Number: 6,093,486
[45] Date of Patent: Jul. 25, 2000

[54] MAGNETIC RECORDING MEDIUM AND MAGNETIC PAINT THEREFOR

[75] Inventors: Kazuhiro Takeda; Kuniharu Fujiki, both of Mito, Japan

[73] Assignee: Victor Company of Japan, Ltd., Yokohama, Japan

[21] Appl. No.: 09/183,411

[22] Filed: Oct. 30, 1998

[30] Foreign Application Priority Data

Oct. 31, 1997 [JP] Japan ..................................... 9-316350

[51] Int. Cl.$^7$ .................................................... G11B 5/708
[52] U.S. Cl. ........................ 428/323; 428/328; 428/329; 428/425.9; 428/694 BN; 428/694 BU; 428/694 BG; 428/900; 252/62.54
[58] Field of Search ........................ 252/62.54; 428/323, 428/328, 329, 425.9, 694 BN, 694 BU, 694 BG, 900

[56] References Cited

U.S. PATENT DOCUMENTS

| 4,571,362 | 2/1986 | Sato et al. | 428/329 |
| 5,536,567 | 7/1996 | Kato et al. | 428/323 |
| 5,935,703 | 8/1999 | Deno et al. | 428/336 |

FOREIGN PATENT DOCUMENTS

| 54-157603 | 12/1979 | Japan . |
| 1-91315 | 4/1989 | Japan . |

*Primary Examiner*—Stevan A. Resan
*Attorney, Agent, or Firm*—Michael N. Meller; Eugene Lieberstein

[57] ABSTRACT

Magnetic paint for producing a magnetic recording medium, the magnetic paint comprises at least ferromagnetic powder, binder, $\alpha\text{-Fe}_2\text{O}_3$ powder, and alumina powder. A relationship between an additive amount (A) of the $\alpha\text{-Fe}_2\text{O}_3$ powder and an additive amount (B) of the alumina powder is $5 \leq (A+B) \leq 25$ weight-parts referred to 100 weight-parts of the ferromagnetic powder and $1 \leq A/B \leq 9$. The binder comprises polyurethane resin containing metal base sulfonic acid and tertiary amine as major ingredients.

2 Claims, No Drawings

MAGNETIC RECORDING MEDIUM AND MAGNETIC PAINT THEREFOR

BACKGROUND OF THE INVENTION

1. Field of the Invention

The present invention relates to a magnetic recording medium and particularly relates to improvements of a magnetic recording medium being excellent in durability and magnetic characteristics.

2. Description of the Related Art

Presently, a magnetic recording medium such as a magnetic tape used for video tape recorders (referred to as VTR) is demanded to have high recording density and high reliability when the magnetic tape is recorded or reproduced. For the purpose of improving durability of the magnetic recording medium, various non-magnetic particles are added in a magnetic coat of the magnetic recording medium and finer particles of ferromagnetic powder are employed to increase packing density thereof.

Major non-magnetic particles above include an antistatic agent used for reducing cohesion of a magnetic tape to guide posts of a VTR while the tape is running, and abrasives used for preventing heads of the VTR from defective recording or reproducing due to dirt of particles dropped off a magnetic coat. However, application of these non-magnetic particles into a magnetic coat causes a decrease of the packing density of ferromagnetic powder, in turn, impedes a demand for high output of the magnetic tape. Such as alumina or the like powders are commonly used as abrasives, but they have following problems although the alumina with its hardness and shape is effective to maintain abrasiveness of a magnetic recording medium. Alumina powder as well as ferromagnetic powder are improved for finer grains. However, the finer grains make it difficult to disperse the powder uniformly into a magnetic coat and degrade magnetic characteristics and reliability.

Accordingly, to improve the above mentioned problems, there provided an improved polyurethane resin which is commonly used for a magnetic recording medium as a binder, wherein the polyurethane resin is improved in functional polar group. For example, a binder composed of a polyurethane resin, which is reacted with metal base sulfonic acid and tertiary amine, is proposed in the Japanese Patent Publication No. S58-41565 and the Japanese Patent Application Laid-open Publication No. H1-91315. However, such binders are still desired to be improved since alumina powder is poor in surface adsorption with resin.

Furthermore, the proposed medium is unsatisfactory as a desirable magnetic recording medium since alumina powder is easily dropped out.

It is difficult to obtain both durability and magnetic characteristics of a magnetic recording medium by a combination of alumina powder as abrasives and polyurethane resin as a binder.

SUMMARY OF THE INVENTION

Accordingly, an object of the present invention is to provide magnetic paint and a magnetic recording medium, which is excellent in high output and durability, in conjunction with eliminating the aforementioned problems of dispersion of the ferromagnetic powder and the non-magnetic powder and durability thereof.

In order to achieve the above object, the present invention provides, according to an aspect thereof, magnetic paint for producing a magnetic recording medium, the magnetic paint comprising at least ferromagnetic powder, binder, $\alpha\text{-}Fe_2O_3$ powder, and alumina powder. A relationship between an additive amount (A) of the $\alpha\text{-}Fe_2O_3$ powder and an additive amount (B) of the alumina powder is as follows: $5 \leq (A+B) \leq 25$ weight-parts referred to 100 weight-parts of the ferromagnetic powder and $1 \leq A/B \leq 9$. The binder comprises polyurethane resin containing metal base sulfonic acid and tertiary amine as major ingredients.

According to another aspect of the present invention, a magnetic recording medium is provided. The magnetic recording medium which comprises a magnetic layer provided on one surface of a non-magnetic support. The magnetic layer is produced from magnetic paint comprising at least ferromagnetic powder, binder, $\alpha\text{-}Fe_2O_3$ powder, and alumina powder. A relationship between an additive amount (A) of the $\alpha\text{-}Fe_2O_3$ powder and an additive amount (B) of the alumina powder is as follows: $5 \leq (A+B) \leq 25$ weight-parts referred to 100 weight-parts of the ferromagnetic powder and $1 \leq A/B \leq 9$. The binder comprises polyurethane resin containing metal base sulfonic acid and tertiary amine as major ingredients.

Further, main ingredients of the binder are polyurethane resin containing metal base sulfonic acid and tertiary amine.

Furthermore, dispersion and packing characteristics of the magnetic layer are improved by using abrasives which contain $\alpha\text{-}Fe_2O_3$ and alumina powders with predetermined amount and mixing ratio, and polyurethane resin containing metal base sulfonic acid and tertiary amine as a binder. Thereby a magnetic recording medium having high output and reliability is obtained.

Other object and further features of the present invention will be apparent from the following detailed description when read in conjunction with the tables.

DETAILED DESCRIPTION OF THE PREFERRED EMBODIMENTS

Prior to a detailed description of an embodiment of the present invention, a description of an outline of the present invention is given in reference to Tables 1, 2, 3 and 4.

Table 1 shows a list of components of magnetic paint for an embodiment of the present invention.

Table 2 shows a combination of $\alpha\text{-}Fe_2O_3$ and alumina powders in weight-parts.

Table 3 shows a polyurethane resin in combination with reactive amounts of metal base sulfonic acid and tertiary amine.

Table 4 shows characteristics of respective embodiments and comparative examples.

[Embodiment 1]

TABLE 1

| Components of magnetic paint | weight-parts |
| --- | --- |
| $\gamma\text{-}Fe_2O_3$ powder including cobalt (Co) | 100 |
| Polyurethane resin "H" shown in Table 3 | 20 |
| Vinyl chloride resin (MR110 by Japan Zeon Co.) | 20 |
| $\alpha\text{-}Fe_2O_3$ and alumina powder | "A" in Table 2 |
| Carbon black | 5 |
| Palmitic acid | 3 |
| Methyl ethyl keton | 120 |
| Toluene | 120 |

Table 1 shows components of magnetic paint to be coated on a support as a magnetic layer in the embodiment 1 of the present invention.

In the Table 1, $\gamma\text{-}Fe_2O_3$ powder including cobalt (Co), which is a ferromagnetic material, is a major magnetic recording substance in the magnetic paint.

Above components shown in the Table 1 are dispersed by using a sand mill for 5 hours, then they are mixed by the dispersion stirring method after 10 weight-parts of three functional isocyanate ("Coronate L" manufactured by Japan Polyurethane Co.) have been added. The mixture is prepared for the magnetic paint with mixed organic solvent of methyl ethyl ketone and toluene. The magnetic paint is coated on a polyethylene terephthalate film and dried. A videotape is thus manufactured by cutting the polyethylene terephthalate film coated with the magnetic paint into one half-inch tape after the surface of the magnetic coat has been treated.

[Embodiments 2 through 5] and

COMPARATIVE EXAMPLES 1 through 4

Components of magnetic paint for the embodiment 2 through the embodiment 5 and the comparative example 1 through the comparative example 4 are the same as for the embodiment 1 except for a use of different polyurethane resins as shown in the Table 3 and different combinations of $\alpha$-$Fe_2O_3$ and alumina powders in weight-parts as shown in the Table 2.

As shown in the Table 1 showing components for the embodiment 1, the polyurethane resin "H" in the Table 3 is employed on the embodiment 1. However, in the other embodiments, the polyurethane resin is replaced by one of "I" through "N" in the Table 3, and similarly, the combination of $\alpha$-$Fe_2O_3$ and alumina powders "A" is replaced by one of "B" through "G" in the Table 2 for the other embodiments and the comparative examples. A sample tape for evaluation is manufactured in the same manner as proposed in the embodiment 1.

Each sample tape is evaluated and measured in an RF (radio frequency signal) output, dispersion, and a still-playback characteristic. In the Table 4, a result of the measurements is depicted. With respect to the RF output, a reproduction output is measured of a 100% white video signal, and is referred to the same RF output of the tape of the comparative example 2 defined to be 0 dB. The dispersion is measured as a surface gloss of a tape by using a glossimeter under a condition of 60 degrees of both an incident angle and a reflection angle. The still-playback characteristic which represents a durability of the magnetic coat is measured as a time duration between the full output and an output attenuated to 50% of the full output reproduced from respective measured tapes recorded with a signal of 4.2 MHz.

TABLE 2

| Symbols representing combinations of $\alpha$-$Fe_2O_3$ and alumina powders | Additive amount of $\alpha$-$Fe_2O_3$ powder (weight-parts) | Additive amount of alumina powder (weight-parts) |
| --- | --- | --- |
| A | 4.5 | 0.5 |
| B | 5 | 5 |
| C | 10 | 10 |
| D | 12.5 | 12.5 |
| E | 22.5 | 2.5 |
| F | 5 | 0 |
| G | 25 | 0 |

TABLE 3

| Representative symbols of polyurethane resin | Reactive amount of metal base sulfonic acid (mmol/g) | Reactive amount of tertiary amine (mmol/g) |
| --- | --- | --- |
| H | 0.005 | 0.1 |
| I | 0.01 | 0.1 |
| J | 0.01 | 0.2 |
| K | 0.03 | 0.4 |
| L | 0.03 | 0.5 |
| M | 0.003 | 0.1 |
| N | 0.01 | 1 |

TABLE 4

| | Combination of $\alpha$-$Fe_2O_3$ and alumina powders used | Polyurethane resin used | RF output (dB) | Dispersion (%) | Still-playback Characteristic |
| --- | --- | --- | --- | --- | --- |
| Embodiment 1 | A | H | 1.8 | 98 | over 1H |
| Embodiment 2 | B | I | 1.2 | 97 | over 1H |
| Embodiment 3 | C | J | 0.7 | 99 | over 1H |
| Embodiment 4 | D | K | 1.0 | 100 | over 1H |
| Embodiment 5 | E | L | 1.0 | 99 | over 1H |
| Comp. exa. 1 | F | H | 0.5 | 95 | 3 min |
| Comp. exa. 2 | G | L | 0.0 | 50 | 5 min |
| Comp. exa. 3 | C | M | −1.0 | 70 | 50 min |
| Comp. exa. 4 | D | N | 0.5 | 85 | 15 min |

Note: "Comp. exa." is abbreviation of "Comparative example".

In the comparative example 1, the still-playback characteristic deteriorates because the alumina powder is not added at all as shown as "F" in the Table 2.

In the comparative example 2, the dispersion deteriorates since excessive additive amount of $\alpha$-$Fe_2O_3$ powder compared with the alumina powder is used as shown as "G" in the Table 2.

In the comparative example 3, the RF output and the dispersion tend to lower in comparison with other embodiments because deficient reactive amount of the metal base sulfonic acid is added into the polyurethane resin as shown as "M" in the Table 3.

In the comparative example 4, since excessive reactive amount of tertiary amine is added into the polyurethane resin as shown as "N" in the Table 3, the magnetic coat tends to be more fragile than that of other embodiments and the still-playback characteristic tends to lower.

On the other hand, the sample tapes manufactured as embodiments "1" to "5" are superior to those of respective comparative examples in the RF output, the dispersion and the still-playback characteristic. The sample tapes of the embodiments are manufactured under following conditions. In the magnetic layer, a relationship between the additive amount (A) of $\alpha$-$Fe_2O_3$ powder and the additive amount (B) of alumina powder is $5 \leq (A+B) \leq 25$ weight-parts referred to 100 weight-parts of the ferromagnetic powder and $1 \leq A/B \leq 9$. A reactive amount of metal base sulfonic acid ranges from 0.005 mmol/g (milli-molecule par gram) to 0.03 mmol/g. A reactive amount of tertiary amine ranges from 0.1 mmol/g to 0.5 mmol/g.

Of the aforementioned embodiments and comparative examples, the following analyses and feasibility studies are made.

An additive amount of $\alpha$-$Fe_2O_3$ and alumina powders as abrasives is desirable from 5 to 25 weight-parts as a total added amount of the two materials with respect to 100 weight-parts of the ferromagnetic powder. In case of less than 5 weight-parts, durability tends to decrease due to inferior abrasiveness. In case of exceeding 25 weight-parts, it is difficult to obtain desirable magnetic characteristics since a packing density of ferromagnetic powder deteriorates.

A ratio of $\alpha$-$Fe_2O_3$ powder to alumina powder is preferable to be between 1:1 and 9:1. In case that the total added amount is 5 weight-parts as a minimum, it is difficult to maintain desired abrasiveness, if an amount of alumina powder is smaller than the amount determined by the ratio, that is, having the ratio of more than 9:1. In case that the total added amount is 25 weight-parts as a maximum, strength of the magnetic coat may decrease due to low dispersion, if an amount of $\alpha$-$Fe_2O_3$ powder is larger than the amount determined by the ratio of 9:1.

An additive amount of a binder is preferable to be from 15 weigh-parts to 65 weight-parts referred to 100 weight-parts of a ferromagnetic powder such as $\alpha$-$Fe_2O_3$ powder including Co used in the embodiments. Further, an additive amount of a polyurethane resin is preferable to be from 25 weight % to 85 weight % referred to a total amount of the binder.

A polyurethane resin used as a binder can be prepared by a reaction of polyhydroxy compound and polyisocyanate. Methods of reacting metal base sulfonic acid and tertiary amine with the polyurethane resin are provided by prior arts. Therefore, the method is not limited to specific one. A reactive amount of metal base sulfonic acid is preferable to be from 0.005 mmol/g to 0.03 mmol/g. In case of less than 0.005 mmol/g, dispersion of ferromagnetic powder tends to lower. In case of over 0.03 mmol/g, dispersion stability of ferromagnetic powder tends to lower due to reaggregation of ferromagnetic powder. A reactive amount of tertiary amine is preferable to be from 0.1 mmol/g to 0.5 mmol/g.

In case of less than 0.1 mmol/g, surface roughness of the resin tends to increase since dispersion becomes poor. In case of over 0.5 mmol/g, reliability tends to lower since the magnetic coat becomes fragile.

According to the aspect of the present invention, a numerical average molecular weight of polyurethane resin is preferable to be from 8000 to 50000. In case that the numerical average molecular weight is less than 8000, dropouts of recorded signals may increase due to dropouts of some components of magnetic coat since a mechanical strength of magnetic coat is weaken. In case of more than 50000, other problems may occur in a magnetic paint (magnetic coating material) manufacturing process such that viscosity of the magnetic paint increases since solubility of polyurethane in solvent decreases. In addition thereto, the polyurethane resin, according to the aspect of the present invention, can be used in combination with other resin such as thermoplastic resin, thermosetting resin, or reactive resin. Therefore, a range of the material is not limited to specific one.

With respect to the ferromagnetic powder and the support, any materials, which are disclosed in the prior arts, can be used. Further, dispersing agent, antistatic agent, lubricant, and anticorrosive agent are acceptable to be added into the magnetic paint. Furthermore, instead of adding antistatic agent into the magnetic coat, a back-coating layer that is formed by coating carbon black dispersed in a binder on opposite surface of magnetic coat is applicable.

In summary, a manufacturing method of magnetic recording medium disclosed in the present invention is as follows; ferromagnetic powder and binding component are dispersed with organic solvent by a dispersing device, which has been disclosed in the prior arts, and filtered. Magnetic paint is coated on a support and dried, then the magnetic recording medium is cut into a predetermined shape after its surface is treated.

According to the present invention, there provided a magnetic recording medium having a superior RF output, an excellent dispersion and furthermore having superior durability which is represented by the still-playback characteristic.

What is claimed is:

1. Magnetic paint for producing a magnetic recording medium, said magnetic paint comprising at least ferromagnetic powder, binder, $\alpha$-$Fe_2O_3$ powder, and alumina powder, wherein a relationship between an additive amount (A) of the $\alpha$-$Fe_2O_3$ powder and an additive amount (B) of the alumina powder is $5 \leq (A+B) \leq 25$ weight-parts referred to 100 weight-parts of said ferromagnetic powder and $1 \leq A/B \leq 9$, and wherein said binder comprises polyurethane resin containing metal base sulfonic acid and tertiary amine as major ingredients.

2. A magnetic recording medium which comprises a magnetic layer provided on one surface of a non-magnetic support, wherein said magnetic layer produced from magnetic paint comprising at least ferromagnetic powder, binder, $\alpha$-$Fe_2O_3$ powder, and alumina powder, and wherein a relationship between an additive amount (A) of the $\alpha$-$Fe_2O_3$ powder and an additive amount (B) of the alumina powder is $5 \leq (A+B) \leq 25$ weight-parts referred to 100 weight-parts of said ferromagnetic powder and $1 \leq A/B \leq 9$, and wherein said binder comprises polyurethane resin containing metal base sulfonic acid and tertiary amine as major ingredients.

* * * * *